(12) United States Patent
Lee et al.

(10) Patent No.: US 12,353,665 B2
(45) Date of Patent: Jul. 8, 2025

(54) TOUCH DEVICE USING RESONANCE SIGNAL OF STYLUS PEN AND TOUCH DETECTION METHOD THEREOF

(71) Applicant: HiDeep, Inc., Seongnam-si (KR)

(72) Inventors: Hwanhee Lee, Seongnam-si (KR); Seyeob Kim, Seongnam-si (KR); Jeongwon Seo, Seongnam-si (KR); Kyeonghan Park, Seongnam-si (KR)

(73) Assignee: HIDEEP, INC., Seongnam-si (KR)

( * ) Notice: Subject to any disclaimer, the term of this patent is extended or adjusted under 35 U.S.C. 154(b) by 0 days.

(21) Appl. No.: 17/907,676

(22) PCT Filed: Dec. 10, 2020

(86) PCT No.: PCT/KR2020/017994
§ 371 (c)(1),
(2) Date: Sep. 29, 2022

(87) PCT Pub. No.: WO2021/206265
PCT Pub. Date: Oct. 14, 2021

(65) Prior Publication Data
US 2023/0229272 A1 Jul. 20, 2023

(30) Foreign Application Priority Data
Apr. 7, 2020 (KR) .......... 10-2020-0041934

(51) Int. Cl.
*G06F 3/044* (2006.01)
*G06F 3/0354* (2013.01)
(Continued)

(52) U.S. Cl.
CPC ........ *G06F 3/0442* (2019.05); *G06F 3/03545* (2013.01); *G06F 3/0383* (2013.01); *G06F 3/04162* (2019.05); *G06F 3/046* (2013.01)

(58) Field of Classification Search
CPC .......... G06F 1/32–3206; G06F 1/3234; G06F 1/3259–3262; G06F 3/0354;
(Continued)

(56) References Cited

U.S. PATENT DOCUMENTS 6,476,799 B1 * 11/2002 Lee .................. G06F 3/046
345/174
2001/0006369 A1 * 7/2001 Ely .................. G06F 1/1626
341/20
(Continued)

FOREIGN PATENT DOCUMENTS

CN 107066122 8/2017
JP 2008-146560 6/2008
(Continued)

OTHER PUBLICATIONS

KIPO, PCT Search Report & Written Opinion of PCT/KR2020/017994 dated Mar. 11, 2021.

*Primary Examiner* — Keith L Crawley
(74) *Attorney, Agent, or Firm* — LEX IP MEISTER, PLLC (57) ABSTRACT

An embodiment of the present disclosure provides a touch apparatus including: a touch sensor; and a touch controller operating in a full driving mode for applying a first driving signal for generating a resonance signal of a stylus pen to the touch sensor and a skip driving mode in which a second driving signal having a period having an off-duty different from that of the first driving signal is applied to the touch sensor, and obtaining touch coordinate information from a detection signal received from the touch sensor.

13 Claims, 9 Drawing Sheets

(51) Int. Cl.
  *G06F 3/038*     (2013.01)
  *G06F 3/041*     (2006.01)
  *G06F 3/046*     (2006.01)

(58) Field of Classification Search
  CPC ....... G06F 3/03545; G06F 3/038–0383; G06F 3/041; G06F 3/0416–04184; G06F 3/044–0442; G06F 3/0446; G06F 3/046; G06F 2203/04106; G06F 2203/04114
  See application file for complete search history.

(56) References Cited

U.S. PATENT DOCUMENTS

| | | | |
|---|---|---|---|
| 2015/0338968 A1* | 11/2015 | Yao | G06F 3/0383 345/174 |
| 2016/0062519 A1* | 3/2016 | Park | G06F 3/0446 345/173 |
| 2016/0147320 A1* | 5/2016 | Krumpelman | G06F 3/04166 345/179 |
| 2017/0090624 A1* | 3/2017 | Kwon | G06F 1/3262 |
| 2017/0185218 A1* | 6/2017 | Lee | G06F 3/04166 |
| 2019/0087052 A1* | 3/2019 | Vandermeijden | G06F 3/03545 |
| 2019/0196642 A1* | 6/2019 | Kong | G06F 3/041662 |

FOREIGN PATENT DOCUMENTS

| | | |
|---|---|---|
| KR | 10-1083679 | 11/2011 |
| KR | 10-2012-0138565 | 12/2012 |
| KR | 10-2013-0128380 | 11/2013 |
| KR | 10-2017-0027243 | 3/2017 |
| KR | 10-2020-0045286 | 5/2020 |
| WO | 2013-084379 | 6/2013 |

* cited by examiner

TOUCH DEVICE USING RESONANCE SIGNAL OF STYLUS PEN AND TOUCH DETECTION METHOD THEREOF

TECHNICAL FIELD

The present disclosure relates to a touch apparatus and a touch detection method therefor, and more particularly, to a touch apparatus for detecting a touch by a stylus pen and a touch detection method therefor.

BACKGROUND ART

Various terminals such as mobile phones, smart phones, tablet PCs, laptop computers, digital broadcasting terminals, PDAs (personal digital assistants), PMPs (portable multimedia players), and navigation devices include touch sensors.

In such a terminal, a touch sensor may be disposed on a display panel displaying an image, or may be disposed in an area of a terminal body. As a user interacts with the terminal by touching the touch sensor, the terminal may provide the user with an intuitive user interface.

The user may use a stylus pen for sophisticated touch input. The stylus pen may transmit and receive signals to and from the touch sensor in an electrical and/or magnetic manner.

DISCLOSURE

Technical Problem

Exemplary embodiments have been made in an effort to provide a touch apparatus with improved touch detection performance and a touch detection method therefor.

Technical Solution

An embodiment of the present invention provides a touch apparatus including: a touch sensor; and a touch controller operating in a first driving mode for applying a first driving signal for generating a resonance signal of a stylus pen to the touch sensor and a second driving mode in which a second driving signal having a period having an off-duty different from that of the first driving signal is applied to the touch sensor, and obtaining touch coordinate information from a detection signal received from the touch sensor.

The touch controller may acquire the touch coordinate information using a detection signal received from the touch sensor during the second driving mode.

The touch controller may obtain an effective signal by using a baseline signal corresponding to a signal received from the touch sensor in a state in which no touch occurs and a detection signal received from the touch sensor during the second driving mode, and may obtain the touch coordinate information from the effective signal.

A period in which the off-duty of the second driving signal is different from that of the first driving signal may have a duty ratio of 1/(2N+1), and N corresponds to a number of consecutively skipped pulses.

A duty ratio of the first driving signal may be 1.

The duty ratio of the first driving signal may not be 1.

The first driving signal and the second driving signal may have different signal levels.

A signal level of the first driving signal may be higher than that of the second driving signal.

The signal level of the first driving signal may be lower than that of the second driving signal.

Another embodiment of the present invention provides a touch apparatus including: a touch sensor; and a touch controller applying a driving signal for generating a resonance signal of a stylus pen to the touch sensor, and obtaining touch coordinate information from a detection signal received from the touch sensor, the driving signal includes a first period for outputting at least one pulse signal having a first duty ratio, and a second period for outputting at least one pulse signal having a second duty ratio that is different from the first duty ratio.

The second duty ratio may be smaller than the first duty ratio.

The touch controller may obtain the touch coordinate information from a detection signal received from the touch sensor while the driving signal is applied to the touch sensor.

Another embodiment of the present invention provides a touch method for a touch apparatus, including: applying a first driving signal for generating a resonance signal of a stylus pen to a touch sensor as a first driving mode is entered; applying a second driving signal having a period having an off-duty different from that of the first driving signal to the touch sensor as a second driving mode is entered; and acquiring touch coordinate information from a detection signal received from the touch sensor.

The obtaining of the touch coordinate information may include obtaining the touch coordinate information by using the detection signal received from the touch sensor during the second driving mode.

The obtaining of the touch coordinate information may include: obtaining an effective signal by using a baseline signal corresponding to a signal outputted through the detection channels in a state in which no touch occurs, and a detection signal outputted from the detection channels during the second driving mode; and obtaining the touch coordinate information from the effective signal.

In the touch detection method, a period in which the off-duty of the second driving signal may be different from that of the first driving signal has a duty ratio of 1/(2N+1), and N may correspond to a number of consecutively skipped pulses.

The applying of the second driving signal may include: outputting at least one first pulse having a same duty ratio as that of the first driving signal; outputting at least one second pulse having a duty ratio that is different from that of the first driving signal; and repeating the outputting the at least one first pulse and the outputting the at least one second pulse.

In the touch detection method, a signal level of the first driving signal may be higher than that of the second driving signal.

In the touch detection method, the signal level of the first driving signal may be lower than that of the second driving signal.

Advantageous Effects

In accordance with a touch apparatus and a touch detection method therefor according to the present disclosure, it is possible to improve a signal-to-noise ratio of an effective signal used for detecting touch coordinates and to secure a sufficient touch signal processing time.

In addition, energy consumption of a touch sensor may be reduced by reducing energy consumption during a period in which a driving signal is outputted to the touch apparatus for resonance of a stylus pen.

MODE FOR INVENTION

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

In addition, unless explicitly described to the contrary, the word "comprise" and variations such as "comprises" or "comprising" will be understood to imply the inclusion of stated elements but not the exclusion of any other elements.

Hereinafter, a touch apparatus and a touch detection method therefor according to embodiments will be described with reference to necessary drawings.

Figure 1:
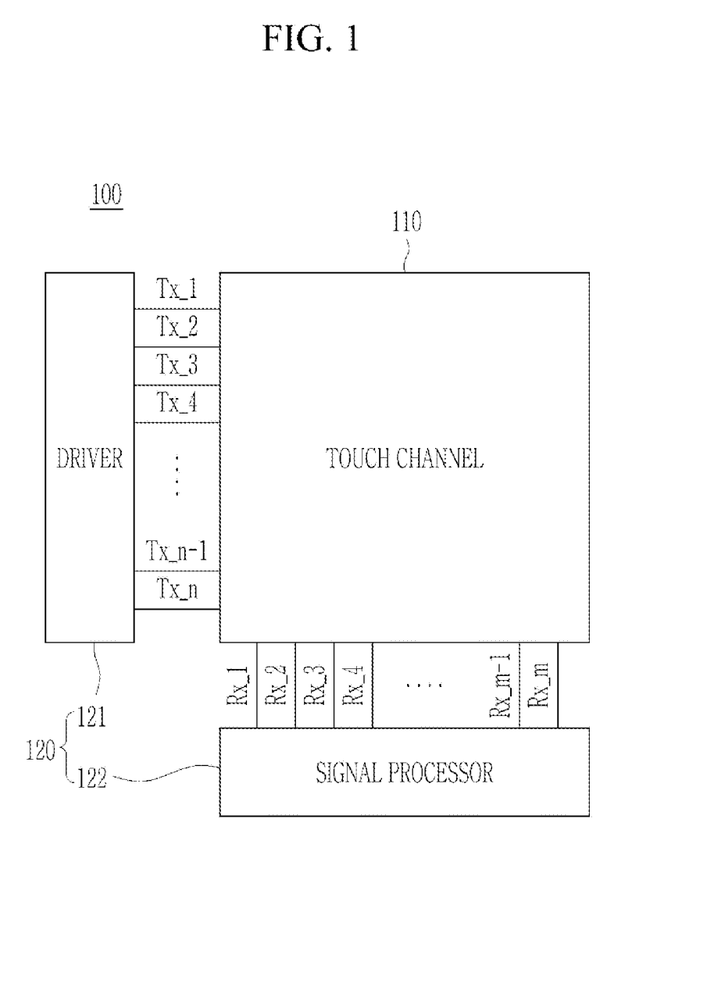
FIG. 1 schematically illustrates a touch apparatus according to an embodiment of the present invention.

FIG. 1 schematically illustrates a touch apparatus according to an embodiment of the present invention. In addition, FIG. 2 illustrates an example in which a touch apparatus detects a touch input of a stylus pen according to an embodiment of the present invention.

Figure 2:
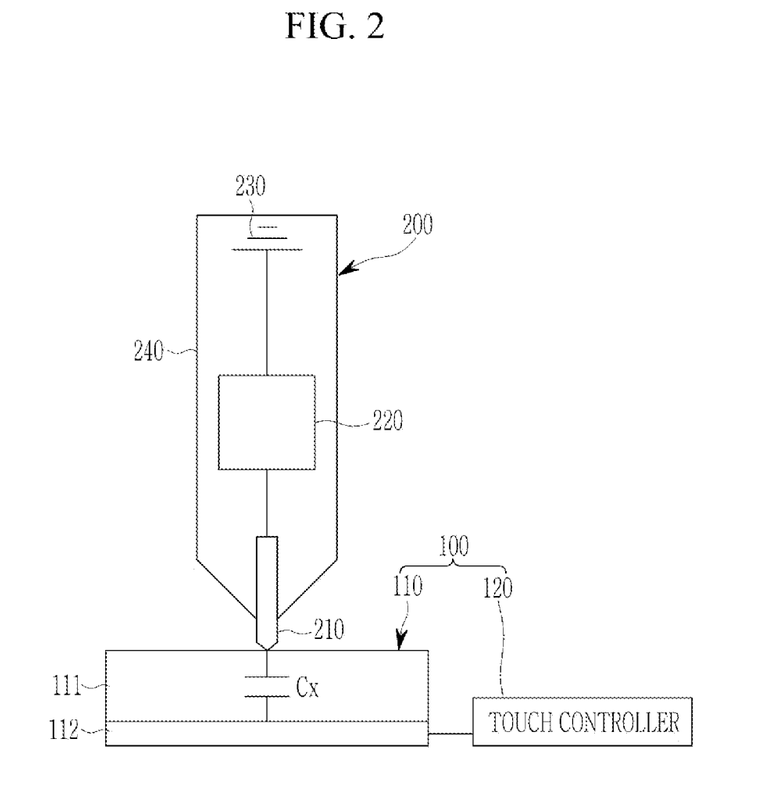
FIG. 2 illustrates an example of a driving mode of a touch apparatus according to an embodiment of the present invention.

Referring to FIG. 1 and FIG. 2, the touch apparatus 100 according to the embodiment of the present invention may include a touch panel 110 and a touch controller 120.

The touch panel 110 may include a substrate 111 and a touch sensor 112 positioned on the substrate 111.

The touch sensor 112 may be used to detect a touch input (direct touch or proximity touch) by a touch object. The touch sensor 112 may operate by receiving a driving signal from the touch controller 120 through a plurality of driving channels Tx_1 to Tx_n, and may output a detection signal corresponding to a touch detection result to the touch controller 120 through a plurality of detection channels Rx_1 to Rx_m.

The touch sensor 112 may detect a touch input of the stylus pen operating in a manner of generating a resonance signal in response to a driving signal applied to the touch sensor 112.

Referring to FIG. 2 as an example, the touch sensor 112 may sense a touch input of the stylus pen 200 operating in an electrically coupled resonance (ECR) method.

The ECR stylus pen 200 may include a conductive tip 210, a resonance circuit 220, a ground 230, and a body 240.

The conductive tip 210 may be at least partially formed of a conductive material (e.g., a metal, a conductive rubber, a conductive fabric, a conductive silicon, etc.), and may be electrically connected to the resonance circuit 220.

The resonance circuit 220 may be an LC resonance circuit, and may resonate with a driving signal that is received from the touch sensor 112 of the touch apparatus 100 through the conductive tip 210. A resonance signal generated when the resonance circuit 220 resonates with the driving signal of the touch sensor 112 may be outputted to the touch sensor 112 through the conductive tip 210. The resonance circuit 220 may output a resonance signal caused by resonance to the conductive tip 210 during a period in which a driving signal is inputted and during a partial period thereafter. The resonant circuit 220 may be disposed in the body 240, and may be electrically connected to the ground 230.

The ECR stylus pen 200 may generate a touch input by generating a resonance signal in response to the driving signal applied to the touch sensor 112 through capacitive coupling by the conductive tip 210. Accordingly, the touch sensor 112 may include a plurality of touch electrodes to detect a touch input by the ECR stylus pen 200, and the touch electrodes may correspond to the driving channels Tx_1 to Tx_n and the detection channels Rx_1 to Rx_m, respectively. That is, each of the respective touch electrodes may receive driving signals through the corresponding driving channels Tx_1 to Tx_n, and may output detection signals corresponding to touch detection results through the corresponding detection channels Rx_1 to Rx_m. In addition, a touch input may be detected by capacitive coupling between the conductive tip 210 of the stylus pen 200 and the touch electrodes of the touch sensor 112. That is, each of the touch electrode of the touch sensors 112, the conductive tip 210 of the stylus pen 200, and the substrate 111 of the touch panel 110 form capacitance Cx by capacitive coupling, and the touch sensor 112 may detect a touch input by outputting an electric signal (detection signal) corresponding thereto.

As described above, when the touch sensor 112 is used to detect a touch input by the ECR stylus pen, the touch sensor 112 may also be used to detect a touch object (e.g., a user's body part (finger, etc.), a passive or active type stylus pen driven by capacitive coupling other than the ECR method) other than the ECR stylus pen 200.

Meanwhile, in FIG. 2, a case in which the touch sensor 112 is used to detect a touch input of the stylus pen 200 driven by the ECR method is illustrated as an example, but the present invention is not limited thereto. The touch sensor 112 may be modified to detect a touch input of another type of stylus pen that generates a resonance signal in response to a driving signal applied to the touch sensor 112, which will be apparent to those skilled in the art.

For example, the touch sensor 112 may detect a touch input of a stylus pen driven by the electromagnetic resonance (EMR) method. The EMR stylus pen may include a coil that induces an electric current by an external magnetic field signal, and may generate a touch input by generating a resonance signal in response to a driving signal applied to the touch sensor 112 by electromagnetic resonance (or electromagnetic induction) of the coil. Accordingly, the touch sensor 112 includes coil-shaped antenna patterns to detect a touch input of the stylus pen driven by the EMR method, and the touch input may be detected by detecting resonance caused by electromagnetic induction generated between the antenna patterns of the touch sensor 112 and the coil of the stylus pen. In this case, each of the antenna patterns included in the touch sensor 112 may receive driving signals through the corresponding driving channels Tx_1 to Tx_n, and may output detection signals corresponding to touch detection results through the corresponding detection channels Rx_1 to Rx_m.

As such, when the touch sensor 112 is deformed to detect a touch input by the EMR stylus pen, the touch sensor 112 may be used only to detect the touch input by the EMR stylus pen. Accordingly, the touch device 100 may additionally include a separate touch sensor to detect a touch input of a touch object other than the EMR stylus pen.

Hereinbelow, to distinguish a stylus pen operating in a manner of generating a resonance signal in response to a driving signal applied to the touch sensor 112, such as the ECR method and the EMR method described above, from passive or active stylus pens that operate in a different way, the stylus pen that generates the resonance signal in response to the driving signal applied to the touch sensor 112 is collectively referred to as a 'resonant stylus pen'.

The touch controller 120 may control driving of the touch sensor 112, and may output touch coordinate information in response to a touch detection result of the touch sensor 112. To this end, the touch controller 120 may include a driver 121 and a signal processor 122.

The driver 121 may output a driving signal to the touch sensor 112 through the driving channels Tx_1 to Tx_n. The driving signal applied from the driver 121 to the driving channels Tx_1 to Tx_n of the touch sensor 112 may include a frequency signal (e.g., a sine wave, a square wave, etc.) corresponding to a resonance frequency of the resonant stylus pen such that the resonant stylus pen can generate a resonance signal (hereinafter, referred to as a 'pen resonance signal') by capacitive coupling or electromagnetic resonance.

The driver 121 may drive a mode for applying a driving signal to the driving channels Tx_1 to Tx_n of the touch sensor 112 by dividing the mode into a full driving mode and a skip driving mode.

The full driving mode is a mode in which a plurality of pulses having a same pulse width are outputted at a same period, and is a mode for quickly reaching the resonance signal of the resonant stylus pen 200 to a predetermined level.

The skip driving mode is a mode for outputting a driving signal in which at least one pulse is periodically omitted from the driving signal outputted in the full driving mode, and is a mode for maintaining the resonance signal of the resonant stylus pen 200 that has reached a predetermined level by the full driving mode at an effective level. Herein, the effective level indicates a level at which the touch apparatus 100 can detect the resonance signal of the stylus pen 200 as a touch signal.

As described above, the driving signal during the effective period is outputted in a form in which at least one pulse is periodically omitted compared to the driving signal outputted in the full driving mode, and thus the driving signals of the skip driving mode and the full driving mode may have different pulse rates. That is, the driving signal outputted in the skip driving mode may have a lower pulse rate than that of the driving signal outputted in the full driving mode. In this document, the pulse rate corresponds to a number of pulses outputted per unit time (e.g., 1 s).

In addition, the driving signal outputted in the skip driving mode may have a period having an off duty that is different from that of the driving signal outputted in the full driving mode due to a period in which a pulse is omitted. For example, when a duty ratio (ratio of on-duty to off-duty) of the driving signal outputted in the full driving mode is 1, the driving signal outputted in the skip driving mode may have a duty ratio of 1/2N, 1/(2N+1), 1/3N, 1/(3N+1), . . . . Herein, N is an integer and corresponds to a number of consecutively skipped pulses. In this document, the on-duty corresponds to a period in which a pulse is output, that is, a pulse width, within one pulse period (period from when a pulse is started to when a next pulse is outputted), and the off-duty corresponds to a period in which no pulse is outputted. Meanwhile, in this document, a case where the duty ratio of the driving signal outputted in the full driving mode is 1 will be described as an example, but since the present invention is not limited thereto, the duty ratio of the driving signal outputted in the full driving mode may not be 1.

Figure 3:
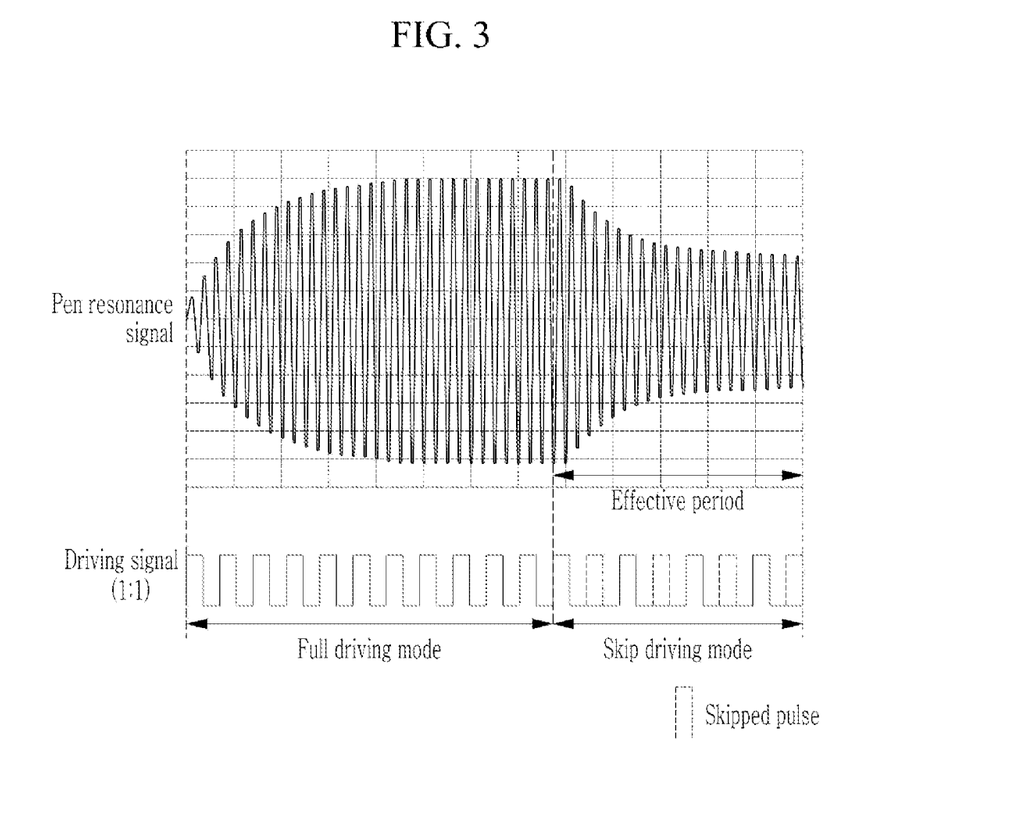
FIG. 3 to FIG. 7 illustrate examples of driving signals outputted from a touch apparatus to a touch sensor according to an embodiment of the present invention.
Figure 4:
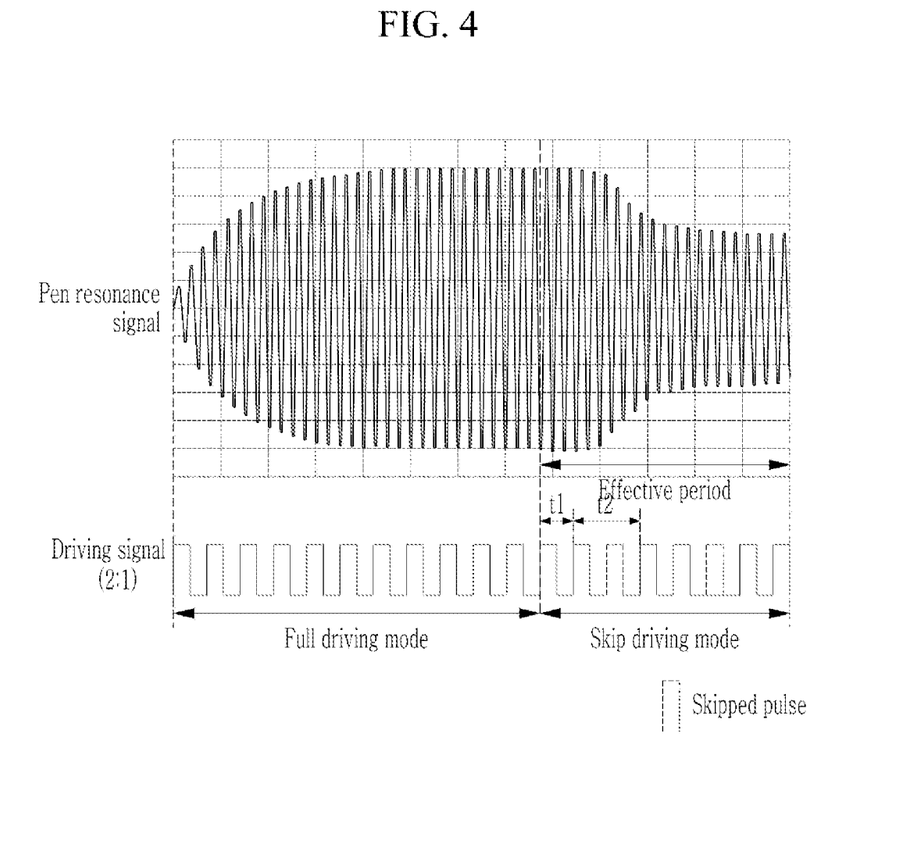

FIG. 3 and FIG. 4 illustrate examples of driving signals outputted from the touch apparatus 100 to the touch sensor 112 according to an embodiment of the present invention.

Referring to FIG. 3, the driver 121 outputs a periodic pulse signal as a driving signal of the touch sensor 112 during the full driving mode to raise the resonance signal of the resonant stylus pen 200 to a predetermined level. Then, when one pulse is outputted in the subsequent skip driving mode compared to the driving signal outputted to the touch sensor 112 in the full driving mode, the resonance signal of the resonant stylus pen 200 is maintained at an effective level by outputting a driving signal in a form in which a next one pulse is omitted to the touch sensor 112. That is, during the skip driving mode, when one pulse is outputted, the driving signal may be outputted in the form of omitting the next one pulse. Accordingly, a pulse signal having a lower duty ratio (or duty cycle) in the skip driving mode compared to that of the full driving mode may be outputted to the touch sensor 112. For example, when the duty ratio of the driving signal outputted during the full driving mode is 1, the duty ratio of the driving signal outputted during the skip driving mode may be lowered to 1/3 due to an increase in off-duty due to pulse skipping.

Referring to FIG. 4, the driver 121 outputs a periodic pulse signal as a driving signal of the touch sensor 112 during the full driving mode to raise the resonance signal of the resonant stylus pen 200 to a predetermined level. Then, whenever two pulses are outputted in the subsequent skip driving mode compared to the driving signal outputted to the touch sensor 112 in the full driving mode, the resonance signal of the resonant stylus pen 200 is maintained at an effective level by outputting a driving signal in a form in which a next one pulse is omitted to the touch sensor 112. That is, during the skip driving mode, when two pulses are outputted, the driving signal may be outputted in the form of omitting the next one pulse. Accordingly, the driving signal outputted during the skip driving mode has a first period t1 in which a pulse signal having a same duty ratio as a pulse outputted during the full driving mode is outputted, and a second period t2 in which a pulse signal having a lower duty ratio than that of the first Period t1 is outputted, which may be repeated. For example, when the duty ratio during the first period t1 is 1, the duty ratio during the second period t2 may be lowered to 1/3 due to an increase in off-duty due to pulse skipping.

Energy transferred from the touch sensor 112 to the resonant stylus pen 200 may increase as a period during which a pulse output is skipped during the skip driving mode decreases. Accordingly, as the period in which the pulse output is skipped during the skip driving mode decreases, a signal level of a pen resonance signal generated during the skip driving mode increases. By referring to FIG. 3 and FIG. 4 as an example, in the driving signal of FIG. 4, one pulse is omitted whenever two pulses are outputted, and thus a signal level of the corresponding pen resonance signal may be increased compared to the driving signal of FIG. 3 in which one pulse is omitted whenever one pulse is outputted.

In addition, as the number of periods during which the pulse output is skipped during the skip driving mode increases, energy consumed for outputting the driving signal may be reduced. Accordingly, as the number of periods during which the pulse output is skipped during the skip driving mode increases, energy consumed by the touch apparatus 100 during the skip driving mode may be reduced. By referring to FIG. 3 and FIG. 4 as an example, in the driving signal of FIG. 3, one pulse is omitted whenever one pulse is outputted, and thus energy consumed by the touch apparatus 100 may be reduced compared to the driving signal of FIG. 4 in which one pulse is omitted whenever two pulses are outputted.

On the other hand, FIG. 3 and FIG. 4 illustrate examples of driving signals outputted from the driver 121 to the touch sensor 112, and a period during which the pulse output is skipped during the skip driving mode may be variously modified.

Figure 5:
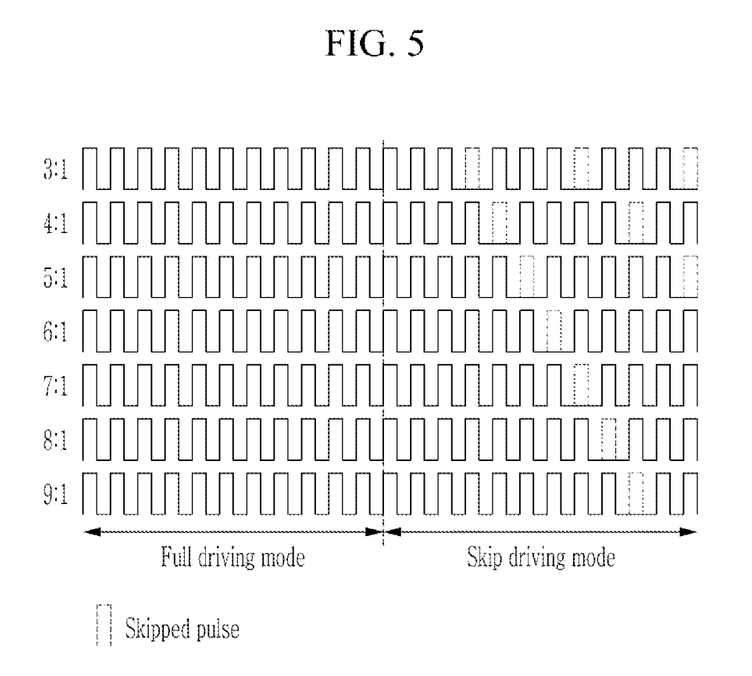
Figure 6:
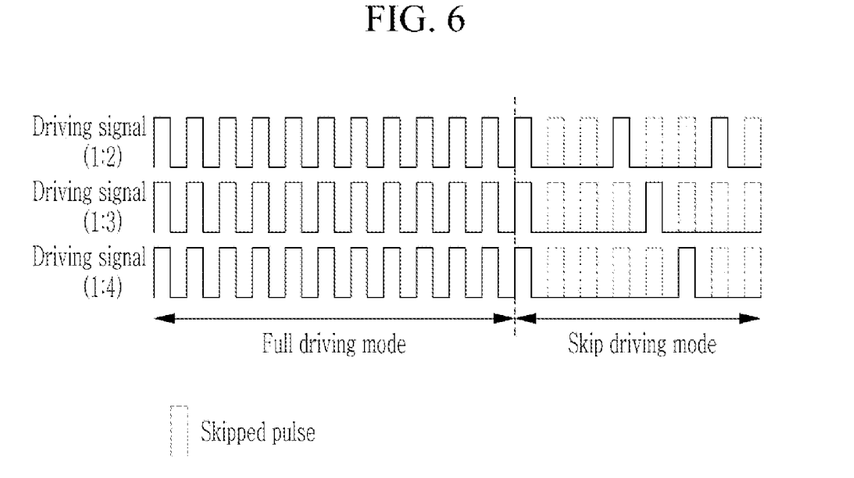
Figure 7:
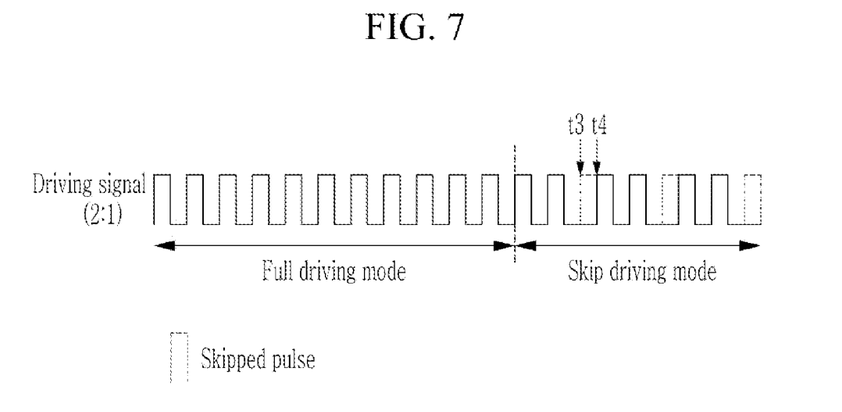

FIG. 5 to FIG. 7 illustrate other examples of driving signals outputted from the touch apparatus 100 to the touch sensor 112 according to an embodiment of the present invention.

Referring to FIG. 5, in the driving signal outputted to the touch sensor 112 during the skip driving mode, a length of the period during which the same pulse is continuously outputted may be variously modified. For example, one pulse may be omitted every time three pulses are outputted, or one pulse may be omitted every time four pulses are outputted. In addition, for example, one pulse may be omitted every time five pulses are outputted, and one pulse may be omitted every time six pulses are outputted. In addition, for example, one pulse may be omitted whenever seven pulses are outputted, or one pulse may be omitted whenever eight pulses are outputted, and one pulse may be omitted whenever nine pulses are outputted. As such, when one pulse is periodically omitted, the duty ratio during the pulse skip period may have a value of $1/(2N+1)=1/3$.

Meanwhile, in the driving signal outputted to the touch sensor 112 during the skip driving mode, the number of continuously skipped pulses may also be variously modified. For example, in FIG. 3 to FIG. 5, a case in which only one pulse is periodically omitted during the skip driving mode is illustrated as an example, but the number of pulses periodically omitted during the skip driving mode may be changed to two or more. By referring to FIG. 6 as an example, a driving signal may be outputted such that a plurality of consecutive pulses (two pulses, three pulses, four pulses, etc.) are periodically skipped during the skip driving mode. For example, when two consecutive pulses are periodically skipped during the skip driving mode, assuming that the duty ratio of the driving signal outputted during the full driving mode is 1, the duty ratio during the pulse skip period of the skip driving mode is $1/(2N+1)=1/5$. In addition, for example, when three consecutive pulses are periodically skipped during the skip driving mode, assuming that the duty ratio of the driving signal outputted during the full driving mode is 1, the duty ratio during the pulse skip period of the skip driving mode is $1/(2N+1)=1/7$. In addition, for example, when four consecutive pulses are periodically skipped during the skip driving mode, assuming that the duty ratio of the driving signal outputted during the full driving mode is 1, the duty ratio during the pulse skip period of the skip driving mode is $1/(2N+1)=1/9$.

In addition, in FIG. 3 to FIG. 5, a case in which a pulse is outputted after an off-duty time has elapsed after pulse skipping during the skip driving mode is illustrated as an example, but timing at which a new pulse is outputted after the pulse skip is also variable. By referring to FIG. 7 as an example, during the skip driving mode, the pulse output may be immediately resumed at a time point t3 when the pulse skip period (interval t3 to t4) ends. Accordingly, the pulse signal outputted after the pulse skipping may have a phase that is opposite to that of the pulse signal outputted before the pulse skipping. In this case, assuming that the duty ratio of the driving signal outputted during the full driving mode is 1, the duty ratio during the pulse skip period of the skip driving mode is $1/2N=1/2$.

As described above, the energy transferred from the touch sensor 112 to the resonant stylus pen 200 increases as the period in which the pulse output is skipped during the skip driving mode decreases, and thus as the number of pulses continuously outputted during the skip driving mode increases, the energy transferred from the touch sensor 112 to the resonant stylus pen 200 may increase. Accordingly, compared to a case of using a driving signal in which one pulse is omitted every time three pulses are outputted, in a case of using a driving signal in which one pulse is omitted every time nine pulses are outputted, the energy transferred from the touch sensor 112 to the resonant stylus pen 200 may increase, and thus the signal level of the corresponding pen resonance signal may increase. In addition, as the number of periods during which the pulse output is skipped during the skip driving mode increases, the energy consumed for outputting the driving signal decreases, and thus as the number of pulses continuously outputted during the skip driving mode decreases, the energy consumption in the touch apparatus 100 may decrease. Accordingly, compared to a case of using a driving signal in which one pulse is omitted every time nine pulses are outputted, in a case of using a driving signal in which one pulse is omitted every time three pulses are outputted, the energy consumption during the skip driving mode of the touch apparatus 100 may be reduced.

In the meantime, in FIG. 3 to FIG. 5, a case where signal levels of the pulses outputted during the full driving mode and the skip driving mode are the same as each other is illustrated as an example, but the signal levels of the pulses outputted during the full driving mode and the skip driving mode may be different from each other. For example, the touch apparatus 100 may set the signal level of the pulse outputted during the full driving mode to be higher than the signal level of the pulse outputted during the skip driving mode in order to reduce a time until the pen resonance signal of the resonant stylus pen 200 reaches a predetermined level. In addition, for example, the touch apparatus 100 may set the signal level of the pulse outputted during the effective period to be higher than the signal level of the pulse outputted during the full driving mode in order to increase the energy transferred to the resonant stylus pen 200 during the effective period.

In addition, FIG. 3 to FIG. 5 illustrate only the full driving mode and the skip driving mode as the driving mode of the driver 121, but the driving modes of the driver 121 may further include an idle mode that disables an output of the driving signal, i.e., a pulse output, another full driving mode for detecting a touch input by a touch object other than the resonant stylus pen (a user body portion or a different type of stylus pen), a driving mode for applying a driving signal having a frequency that is different from that of the skip driving mode to the touch sensor 112, etc., in addition to the full driving mode and the skip driving mode. Meanwhile, when the driving mode of the driving mode 121 includes the idle mode, the idle mode may be performed after the skip driving mode. In addition, when the driving mode of the driver 121 additionally includes a mode of applying a driving signal of a frequency that is different from that of the full driving mode and the skip driving mode to the touch sensor 112, the mode may be performed immediately before the full driving mode.

Referring again to FIG. 1, the signal processor 122 may receive detection signals corresponding to touch inputs from the detection channels Rx_1 to Rx_m of the touch sensor 112. In addition, it is possible to obtain position information (hereinafter, referred to as 'touch coordinate information') of a point where a touch occurs by processing the received detection signal. To this end, the signal processor 122 may include an analog to digital converter (ADC) and the like.

The resonant stylus pen may output a pen resonance signal in some sections of the full driving mode and the skip driving mode in which the driving signal is applied to the touch sensor 112 and the idle mode in which the driving signal is disabled when the resonant stylus pen touches the touch apparatus 100 regardless of operating in which method of ECR and EMR.

Accordingly, the signal processor 122 may receive the detection signal of the touch sensor 112 during a touch driving mode period (full driving mode period and skip driving mode period) or some section of an idle mode period, and may acquire touch coordinate information of the resonant stylus pen by using it.

For example, the signal processor 122 may obtain touch coordinate information of the resonant stylus pen by using the detection signal received from the touch sensor 112 during the skip driving mode period.

Figure 8:
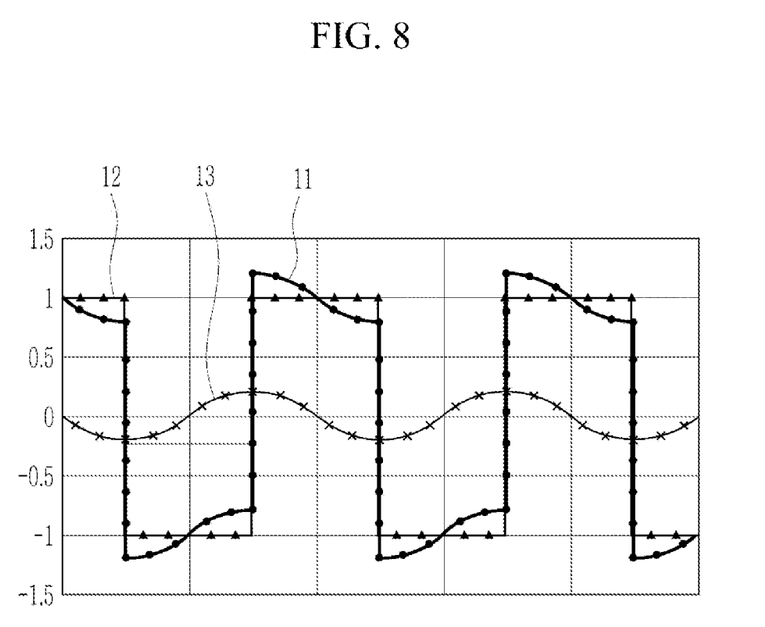
FIG. 8 illustrates a view for describing a method of acquiring touch coordinate information of a touch apparatus according to an embodiment of the present invention.

A detection signal 11 received from the touch sensor 112 during the skip driving mode period, as illustrated in FIG. 8, may include not only a signal 13 corresponding to the pen resonance signal of the resonant stylus pen, but also a signal 12 corresponding to the driving signal applied to the touch sensor 112. Accordingly, it is necessary to extract an effective signal used for detecting touch coordinates, i.e., a signal corresponding to the pen resonance signal 13 of the resonant stylus pen, from the detection signal 11 in order to obtain touch coordinate information from the detection signal 11 received from the touch sensor 112 during the skip driving mode period. To this end, the touch controller 120 may extract the effective signal 13 by using the detection signal 12 (hereinafter, referred to as a 'baseline signal') in a state in which no touch is generated and the detection signal 11 is received from the actual touch sensor 112. That is, the signal processor 122 may obtain an effective signal component corresponding to the resonance signal of the resonant stylus pen from a signal component difference between the baseline signal 12 and the detection signal 11 received from the actual touch sensor 112.

When obtaining the effective signal component in this way, the signal processor 122 may compare it with a predetermined threshold value to obtain touch coordinate information. Herein, signal components of the baseline signal used for detection of the effective signal component may be obtained in advance by measuring the detection signal outputted from the touch sensor 112 in a state where no touch occurs, may be estimated from the driving signal outputted to the touch sensor 112 during the skip driving mode, and may be detection signals received from another touch sensor in a state in which no touch has occurred.

In the meantime, as in a case where the touch sensor 112 detects a touch input of the ECR stylus pen, it may be used to detect a touch input for a touch object other than the resonant stylus pen (e.g., a body portion of a user, a stylus pen operating in a manner other than resonance, etc.). In this case, the effective signal components extracted from the detection signal of the touch sensor 112 received during the touch driving mode (the full driving mode and the skip driving mode) may be signal components corresponding to a change in capacitance due to a touch of a touch object other than the resonant stylus pen. Accordingly, the signal processor 122 may additionally perform a process of determining a type of the touch object by using the detection signal outputted from the touch sensor 112.

For example, the signal processor 122 may use effective signal components extracted from the detection signal of the touch sensor 112 received during the touch driving mode (the full driving mode and the skip driving mode) to determine the type of the touch object. The signal processing unit 122 may determine that the type of the touch object is a resonant stylus pen when a signal component corresponding to the pen resonance signal is detected from the effective signal (refer to reference numeral 13 in FIG. 8) extracted from the detection signal of the touch sensor 112. On the other hand, when the signal component corresponding to the pen resonance signal is not detected from the effective signal 13, the signal processor 122 may determine that the type of the touch object is not a resonant stylus pen, but a body portion of a user or a different type of stylus pen.

In addition, for example, the signal processor 122 may determine the type of the touch object that generated the touch inputted from the detection signal received from the touch sensor 112 during the idle mode period. When a touch input by the resonant stylus pen is generated, the pen resonance signal continues not only during the touch driving mode (the full driving mode and the skip driving mode) period but also until a portion of the following idle mode period. Accordingly, the resonance signal of the resonant stylus pen affects the detection signal of the touch sensor 112 even in the idle mode. Accordingly, when a touch input is detected in the touch driving mode (the full driving mode and the skip driving mode), the signal processor 122 may analyze the detection signal during the subsequent idle mode period to determine the type of the touch object that generated the touch input.

The touch apparatus 100 having the above-described structure may be coupled to an electronic device such as a display to be used as an input device.

Figure 9:
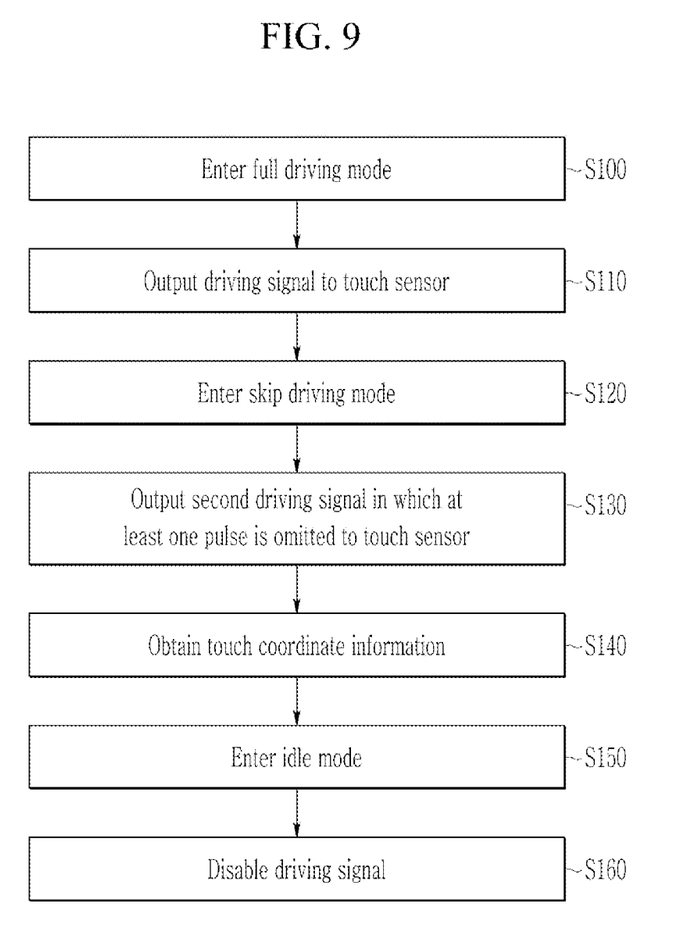
FIG. 9 schematically illustrates a touch detection method for a touch apparatus according to an embodiment of the present invention.

FIG. 9 schematically illustrates a touch detection method for a touch apparatus according to an embodiment of the present invention. The touch detection method illustrated in FIG. 9 may be executed by the touch controller 120 of the touch apparatus 100 described above with reference to FIG. 1 and FIG. 2.

Referring to FIG. 9, when entering a full driving mode (S100), the touch controller 120 of the touch apparatus 100 according to an exemplary embodiment of the present invention outputs a first driving signal in which a plurality of pulses having a same pulse width are generated during a same period to the touch sensor 112 through the driving channels Tx_1 to Tx_n (S110).

In step S110, the touch controller 120 may apply a pulse signal including a signal of the same frequency as that of the resonance signal of the resonant stylus pen 200 to the touch sensor 112 during the full driving mode, thereby increasing the pen resonance signal of the resonant stylus pen 200 to a predetermined level.

When the full driving mode ends, the touch controller 120 enters the skip driving mode (S120). In addition, during the skip driving mode, a second driving signal in a form in which at least one pulse is omitted from the first driving signal is output to the touch sensor 112 through the driving channels Tx_1 to Tx_n (S130).

In step S130, the second driving signal outputted in the skip driving mode may be outputted in a form in which at least one pulse is periodically omitted compared to the first driving signal outputted in the full driving mode. Accordingly, a second driving signal outputted in the skip driving mode may have a lower pulse rate than that of the driving signal outputted in the full driving mode.

The touch controller 120 receives the detection signal from the touch sensor 112 during the skip driving mode period, and analyzes it to obtain touch coordinate information (S140).

In step S140, the touch controller 120 may obtain an effective signal component corresponding to the pen resonance signal from a signal component difference between the baseline signal and the detection signal actually received from the touch sensor 112, and may analyze it to acquire touch coordinate information by the ECR pen.

Thereafter, when entering the idle mode, the touch controller 120 disables the driving signal outputted to the touch sensor 112 (S160).

The touch controller 120 may perform continuous touch detection by repeating steps S100 and S160 while the touch device 100 is being driven.

As described above, the touch apparatus 100 according to an embodiment of the present invention raises the resonance signal of the resonant stylus pen 200 to a predetermined level through the full driving mode, and then maintains the pen resonance signal within an effective level through a skip driving mode. As such, when detecting the touch coordinate information from the detection signal received from the touch sensor 112 while maintaining the pen resonance signal within the effective level through the skip driving mode, a signal to noise ratio (SNR) of an effective signal used for detecting touch coordinates may be improved, and a sufficient touch signal processing time may be secured compared to a conventional method of acquiring touch coordinate information of the resonant stylus pen 200 by receiving a detection signal from the touch sensor 112 during the idle mode period.

In addition, energy consumption of the touch apparatus 100 may be reduced by reducing energy consumption during a period in which the driving signal is outputted to the touch sensor for resonance of the stylus pen 200.

The above detailed description should not be construed as limiting in all aspects and should be considered as illustrative. The scope of the present invention should be determined by reasonable interpretation of the appended claims, and all changes within the equivalent range of the present invention are included in the scope of the present invention.

The invention claimed is:

1. A touch apparatus comprising:
a touch sensor; and
a touch controller configured to operate in a driving mode for applying a driving signal for generating a resonance signal of a stylus pen to the touch sensor, and obtain touch coordinate information from a detection signal received from the touch sensor,
wherein the driving signal includes at least one pulse signal having a duty ratio other than 1,
wherein the driving mode includes a first driving mode in which a first driving signal is applied to the touch sensor and a second driving mode in which a second driving signal having an off-duty different from that of the first driving signal is applied to the touch sensor, and
wherein the touch controller is configured to obtain the touch coordinate information using a detection signal received from the touch sensor while the second driving signal is applied to the touch sensor,
wherein the second driving signal includes a signal having a different phase from the first driving signal, and
wherein the touch controller is configured to operate in the first driving mode during a first time section and to operate in the second driving mode during a second time section different from the first time section, and
wherein the first driving signal and the second driving signal have different signal levels, and
wherein the first driving signal includes a plurality of consecutive first pulses each having a first signal level, and the second driving signal includes a plurality of consecutive second pulses each having a second signal level different from the first signal level.

2. The touch apparatus of claim 1, wherein the touch controller is configured to obtain an effective signal by using a baseline signal corresponding to a signal received from the touch sensor in a state in which no touch occurs and a detection signal received from the touch sensor during the second driving mode, and obtains the touch coordinate information from the effective signal.

3. The touch apparatus of claim 1, wherein a period in which the off-duty of the second driving signal is different from that of the first driving signal has a duty ratio of 1/(2N+1), and N corresponds to a number of consecutively skipped pulses.

4. The touch apparatus of claim 1, wherein a duty ratio of the first driving signal is 1.

5. The touch apparatus of claim 1, wherein a duty ratio of the first driving signal is not 1.

6. The touch apparatus of claim 1, wherein a signal level of the first driving signal is higher than that of the second driving signal.

7. The touch apparatus of claim 1, wherein a signal level of the first driving signal is lower than that of the second driving signal.

8. A touch detection method for a touch apparatus, comprising:
applying a driving signal for generating a resonance signal of a stylus pen to a touch sensor; and
obtaining touch coordinate information from a detection signal received from the touch sensor;
wherein the driving signal includes at least one pulse signal having a duty ratio other than 1,
wherein the applying includes:
applying a first driving signal to the touch sensor during a first time section in which the touch apparatus operates in a first driving mode; and
applying a second driving signal having an off-duty different from that of the first driving signal to the touch sensor during a second time section in which the touch apparatus operates in a second driving mode, and
wherein the obtaining of the touch coordinate information includes obtaining the touch coordinate information by using the detection signal received from the touch sensor while the second driving signal is applied to the touch sensor,
wherein the second driving signal includes a signal having a different phase from the first driving signal,
wherein the first time section is different from the second time section, wherein the first driving signal and the second driving signal have different signal levels, and wherein the first driving signal includes a plurality of consecutive first pulses each having a first signal level, and the second driving signal includes a plurality of consecutive second pulses each having a second signal level different from the first signal level.

9. The touch detection method of claim 8, wherein the acquiring of the touch coordinate information includes:

obtaining an effective signal by using a baseline signal corresponding to a signal received from the touch sensor in a state in which no touch occurs and a detection signal received from the touch sensor during the second driving mode; and obtaining the touch coordinate information from the effective signal.

10. The touch detection method of claim 8, wherein
a period in which the off-duty of the second driving signal is different from that of the first driving signal has a duty ratio of 1/(2N+1), and N corresponds to a number of consecutively skipped pulses.

11. The touch detection method of claim 8, wherein
the applying of the second driving signal includes:
outputting at least one first pulse having a same duty ratio as that of the first driving signal;
outputting at least one second pulse having a duty ratio that is different from that of the first driving signal; and
repeating the outputting of the at least one first pulse and the outputting of the at least one second pulse.

12. The touch detection method of claim 8, wherein
a signal level of the first driving signal is higher than that of the second driving signal.

13. The touch detection method of claim 8, wherein
a signal level of the first driving signal is lower than that of the second driving signal.

* * * * *